United States Patent [19]

Dougan

[11] 4,275,082
[45] Jun. 23, 1981

[54] FROZEN PUFF PASTRY AND EDIBLE INSERT COMBINATION AND PROCESS

[75] Inventor: Ernest V. Dougan, Southport, Conn.

[73] Assignee: Standard Brands Incorporated, New York, N.Y.

[21] Appl. No.: 124,497

[22] Filed: Feb. 25, 1980

[51] Int. Cl.³ .................. A21D 6/00; A21D 13/08; A23G 3/00; A23L 1/31

[52] U.S. Cl. .................................. 426/92; 426/94; 426/95; 426/100; 426/138; 426/139; 426/283; 426/556; 426/503

[58] Field of Search ............... 426/100, 143, 283, 503, 426/499, 556, 559, 138, 94, 496, 391, 92, 95, 139

[56] References Cited

U.S. PATENT DOCUMENTS

| | | | |
|---|---|---|---|
| 3,219,456 | 11/1965 | Matz et al. | 426/297 |
| 3,655,402 | 4/1972 | Dougan | 426/283 |

OTHER PUBLICATIONS

Child, J. & Beck, S.; *Mastering the Art of French Cooking*, vol. 2; 1974; pp. 111-118, 123-132 & 454-461.

Primary Examiner—Joseph M. Golian
Assistant Examiner—Elizabeth J. Curtin
Attorney, Agent, or Firm—Richard Kornutik

[57] ABSTRACT

A food product suitable for preparing a filled pastry shell and a method for preparing it are disclosed. The food product comprises an unbaked sheet of puff pastry dough which comprises a central portion which is sufficiently disrupted to reduce normal rising and a substantially-continuous peripheral portion which rises to a greater extent than the central portion during baking. According to a preferred embodiment of the invention, a frozen food insert is disposed over the central portion of the sheet and, during baking, the insert cooks to fill a recess formed as the peripheral portion of the sheet rises to form a shell. According to a preferred aspect of the process, a sheet of puff pastry dough is perforated in the central portion, while leaving a substantially-continuous peripheral portion, and the sheet is then baked, preferably with a food filling covering the perforated central portion, to effect the formation of a pastry shell due to the peripheral portion of the sheet rising to an extent greater than the central portion.

16 Claims, 4 Drawing Figures

U.S. Patent    Jun. 23, 1981    4,275,082
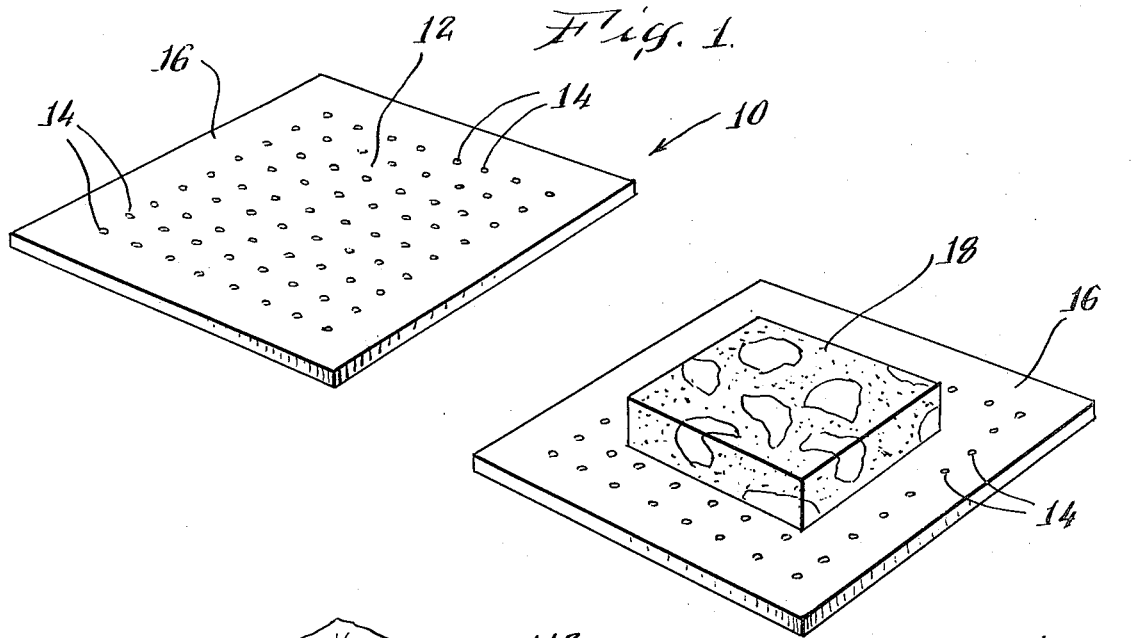
Fig. 1.
Fig. 2.
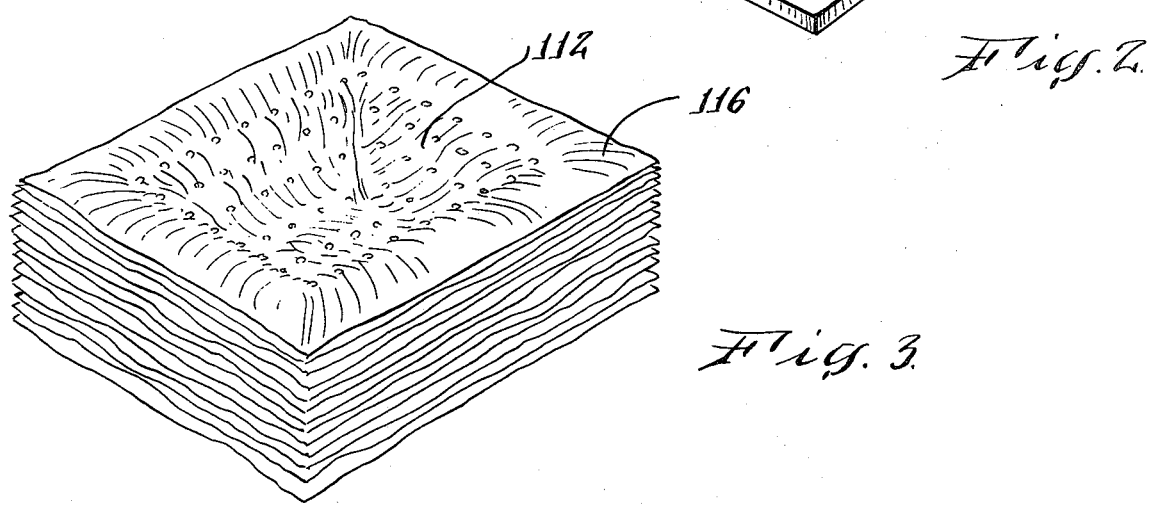
Fig. 3.
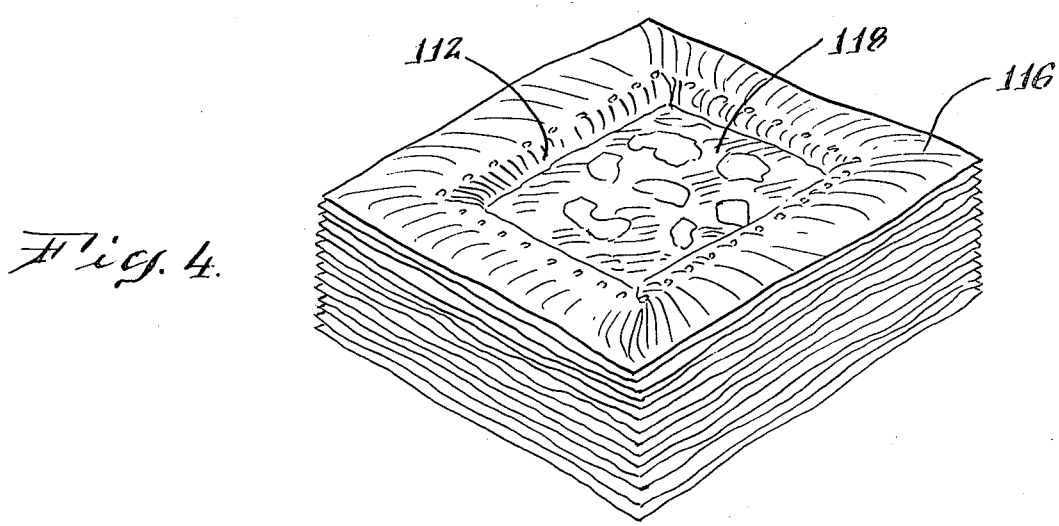
Fig. 4.

FROZEN PUFF PASTRY AND EDIBLE INSERT COMBINATION AND PROCESS

BACKGROUND OF THE INVENTION

The present invention relates to puffed pastry shells; and, more particularly, to a food product comprising an improved sheet of puff pastry dough, which can be baked with a food insert to provide a filled puff pastry shell, and to a process for preparing the food product.

Broadly, puff pastry dough is prepared in sheets having planar, parallel areas of fat disposed throughout, which separate large areas of dough within the sheet into a multiplicity of dough layers. Depending upon the procedure employed to prepare the puff pastry dough, the layers of dough within the sheet can extend over the entire, or only a portion of the total, surface area of the sheet. The important feature of puff pastry which distinguishes it from short or other doughs is that it rises upon baking to yield a crisp, light pastry which is characterized by a structure of parallel, horizontal flakes.

Traditionally, puff pastry dough is made by first preparing a folded sheet of dough having at least one layer of fat sandwiched between at least two layers of dough, and then alternately folding and rolling the sheet. This process results in a composite having a large number of thin layers of dough, separated from each other by interposed layers of fat. Variations on this basic concept have been made and also produce successful puff pastry doughs. For example, in U.S. Pat. No. 3,151,987 to S. F. Colby, there is described a process comprising the extrusion of alternate dough and fat layers which are then rolled, cut, laminated and rolled again to prepare a dough sheet which preferably comprises about 400 substantially continuous layers of dough, separated from each other by fat layers.

When a sheet of puff pastry dough is baked, it rises into a flaky, multi-layered product, and is ideal for use with suitable fillings to provide napoleans, turnovers, strudels, casserole covers, meat-filled pastries, and the like. And, in most applications, this desirable rising and flaking is obtained without the aid of yeast or chemical leaveners. The rising and flaking which occurs is due principally to the vaporization of moisture and the expansion of air which has been entrapped in the dough.

While the preparation of composite foods, especially those requiring pastry shells, is one of the most appealing applications of puff pastry dough, there are a number of problems which have complicated this particular use. One problem is the difficulty in preparing a baked shell having a fully-cooked, thin bottom wall surrounded by an expanded, upstanding side wall. This problem arises because the sheet of puff pastry dough tends to rise substantially uniformly, making it necessary, when using a sheet of uniform thickness, to cut out a recess in the central portion after baking. This results in both extra work and a substantial amount of waste. One approach to solving this problem is suggested in my earlier U.S. Pat. No. 3,655,402, which discloses forming a patty shell from a composite puff pastry dough preform, wherein the side and bottom forming portions are of different thicknesses. The composite is formed by laminating an annular side-forming portion to a flat sheet for forming the bottom wall. Preferably, the side-forming portion is several times the thickness of the sheet for forming the bottom. A frozen filling, encased in an open-bottomed cylindrical container, stands on the bottom member and guides the rise of the side-forming material to provide a well-shaped, crisp and flaky shell. After baking is complete, the cylindrical container is withdrawn to empty its contents into the shell.

Another problem frequently encountered in the preparation of filled puff pastry shells arises from contact of the moist filling with the surface of the dough during baking of a filled shell. Moisture in the filling tends to be absorbed by the contacting dough surfaces, with the result that the crust becomes tough and soggy and fails to rise as well as desired. Moreover, the dough underlying the filling may remain undesirably moist and be grossly undercooked. To overcome this problem, edible water-absorbing materials such as starch and flour are commonly incorporated into moist fillings. One drawback to this procedure is that fillings which require large amounts of water also require the use of large amounts of water absorbants, which may be unacceptable from an organoleptic standpoint.

According to another approach, Matz et al in U.S. Pat. Nos. 3,219,456 and 3,293,043 coat a chilled, uncooked puff pastry dough preform with acetylated monoglycerides, which form a moisture barrier between the filling and the dough.

SUMMARY OF THE INVENTION

In view of the difficulties with the prior art, it is an object of the present invention to provide an improved food product, and an improved process for preparing it, which overcomes the problems and disadvantages of the prior art.

It is a more specific object of the present invention to provide a food product and a process for preparing it, wherein the food product is adapted for the preparation of a filled pastry shell from a substantially-flat sheet of puff pastry dough with no wastage of material.

It is a further specific object of the present invention to provide a food product, and a process for preparing it, which enables the preparation of a filled, fully-cooked pastry shell from a substantially-flat sheet of puff pastry dough having a food insert placed thereon.

These and other objects are accomplished according to the present invention which provides a food product adapted for the preparation of a filled pastry shell and a process for preparing the food product. The food product of the invention comprises an unbaked sheet of puff pastry dough which comprises a central portion which is sufficiently disrupted to reduce normal rising, and a substantially-continuous peripheral portion which rises to a greater extent than the central portion during baking. The process comprises providing a substantially-continuous, unbaked sheet of puff pastry dough, and disrupting the central portion of the sheet, while leaving the peripheral portion substantially continuous.

BRIEF DESCRIPTION OF THE DRAWINGS

The invention will be better understood and its advantages will become more apparent from the following detailed description of the invention, especially when read in light of the attached drawings wherein:

FIG. 1 is a perspective view of a food product according to the present invention comprising a sheet of puff pastry dough having a central portion disrupted with perforations;

FIG. 2 is a perspective view of a preferred embodiment of a food product according to the invention, wherein a food insert is placed over perforations in the central portion of a sheet of puff pastry dough;

FIG. 3 is a perspective view showing a food product which results from baking a product as shown in FIG. 1 without a filling; and FIG. 4 is a perspective view showing a food product which results from baking a product as shown in FIG. 2.

DETAILED DESCRIPTION

The improvements provided according to the present invention are applicable to puff pastry doughs of widely-divergent formulations and methods of preparation. Thus, there are included within this term all of those doughs which, upon baking, rise to yield crisp, light pastries characterized by structures of parallel, horizontal flakes. Puff pastry doughs are typically formed into sheets comprising a plurality of thin, substantially-continuous dough layers, which are separated from each other by interposed layers of fat. One suitable method for preparing the puff pastry dough is set forth in U.S. Pat. No. 3,151,987 to S. F. Colby, which is described briefly above. The disclosure of this patent is incorporated herein by reference. Another, and more preferred, method of preparing the puff pastry dough is the traditional method involving folding and rolling of a fat and dough layered composite as set forth, for example, in U.S. Pat. No. 2,442,537 to Eckey, U.S. Pat. No. 3,250,627 to Thelen, U.S. Pat. No. 3,655,402 to Dougan and the references cited in these, all of these patents and references being incorporated herein by reference. For the purpose of conciseness, the following description will describe the invention in specific relation to a preferred embodiment of the traditional folding and rolling approach.

FIG. 1 shows a sheet 10 of puff pastry dough having the central portion 12 of the surface thereof disrupted by perforations 14. The sheet 10 is shown here as square, but can be any desired shape, including round, triangular, and the like. The peripheral portion 16 of the sheet 10 remains substantially continuous, and is preferably free from any perforations 14 or other disruptions which will affect the degree of rising during baking. The perforations in the central portion 12 of the sheet 10 disrupt the continuity of the individual dough layers within the sheet 10 and permit the release of steam and expanding air or other entrapped gases. This release results in a decreased expansion in the area disrupted, but surprisingly does not result in a decreased degree of cooking. Unexpectedly, in fact, it results in more complete cooking of the central portion when a food insert, such as 18 shown in FIG. 2, is placed thereover during baking. The exact reason for the improved cooking is not fully understood, but is believed due to improved heat transfer to the upper layers of dough and improved removal of moisture necessary for good baking.

The embodiment of the invention illustrated in FIG. 1 shows surface disruptions in the form of perforations 14 which preferably extend through at least one half the thickness of the sheet 10. It is possible to employ disruptions other than circular perforations. The disruptions can, in fact, be of any shape and extent through the thickness of the sheet 10 which is effective to decrease the degree of expansion of the area perforated, without otherwise destroying the integrity of the sheet. Similarly, the pattern of the perforations is not critical but can be in any arrangement effective to sufficiently disrupt the central portion to reduce its ability to rise. It is typical to evenly space perforations 14 at distances of from 1/16 to about ½ inch, and preferably about ⅛ to ⅜ inch.

The perforations 14 are preferably formed by penetrating the surface of the sheet with a plurality of pins arranged in the desired pattern. One manner of doing this is to vertically move a member holding the desired number of pins such that the pins contact and perforate the central portion 12 of a sheet 10. This could be done in one or a number of vertical movements with one or a number of pin-carrying members. Alternatively, pins could be arranged in the desired pattern on the surface of a cylinder which is moved in unison with a sheet 10 to continuously disrupt the surface of the sheet 10 in the desired pattern.

The peripheral portion 16 of the sheet 10 must be of a width effective to permit it to rise to a greater extent than the central portion 12. There is no known criticality in the width; however, a good differential in rising between the peripheral and central portions, 12 and 16 respectively, of the sheet 10 will typically require that the peripheral portion 16 be at least as wide, from the outer peripheral edge of the sheet 10 to the outermost perforation 14 in the central portion 12, as the shortest distance separating the individual perforations 14. Preferably, the peripheral portion 16 will be at least one and one half times as wide as this distance between perforations. The maximum width of the peripheral portion 16 is determined solely on the basis of the desired end product, and is not critical from a functional standpoint. However, where the food product of the invention is desired to be employed for preparing a pastry shell to be used with a filling, the peripheral portion 16 should not be excessively wider. Typically, the peripheral portion in this embodiment will be from about ¼ to about 1 inch, depending to some extent on the overall size of the product. Preferably, the width of the peripheral portion 16 will be within the range of from ⅜ to ¾ inch.

The sheet 10 is preferably of uniform thickness. Typically, the sheet 10 will be from about 1/16 to about ¼ inch in thickness from top to bottom, but can be thinner or thicker, depending on the particular end use desired. Most usually, the sheet 10 will be from about ⅛ to 3/16 inch in thickness. It is possible to form the sheet 10 with variations in thickness; however, it is a principal advantage of the invention that adequate variations in the degree of rising can be achieved from a flat sheet of dough without the need to presize individual areas. It remains possible, however, to enhance this differential rising action or to provide decoration, or to otherwise achieve some desired effect, by employing a sheet with variations in thickness effective to achieve these results.

When preparing a sheet 10 of puff pastry dough by the traditional folding and rolling procedure, a dough mixture of flour and water is first formed and rolled flat. Two thirds of the resulting rolled sheet are then coated with fat. The uncoated one third of the sheet is then folded onto the adjacent fat-coated third, and the remaining fat-coated third is folded over the top to form a composite having three layers of dough, separated by two layers of fat. This layered composite is then dusted with flour and rolled evenly to approximately the original size, it being important to maintain as uniform a thickness as possible. After rolling, excess flour is brushed off and the dough is again folded in three. The dough must be permitted to rest for a time period of from about 15 to 20 minutes, and is covered and maintained cool during the rest period. This rolling, folding, and resting is repeated several, typically 3 to 5, additional times before final rolling. There results a composite sheet of puff pastry dough which comprises a plurality of thin, substantially-continuous dough layers which are separated from each other by interposed layers of fat. The preferred products will comprise at least 10 dough layers, separated from each other by layers of fat.

The final results of this process for forming the puff pastry dough depend as much on the skill and experience of the person performing it as they do on the use of the correct ingredients. Typically, the dough layers which make up the sheet comprise flour and water exclusively, but can contain other materials as are known to the art for their desired functions. Thus, flavors, fat, texture modifiers, and the like can be employed, but are not necessary. The flour preferably will be a high gluten content flour, because this enables the best elongation of the dough during rolling and results in best leavening due to natural expansion of gases during baking. To further improve this elongation characteristic, an acid such as cream of tartar, lemon juice, or vinegar can be employed. They cause the protein, i.e., gluten, content of the flour to become more elastic, thus enabling it to stretch rather than break. Conversely, a less-elastic, more-tender dough can be prepared by adding fat or an amount of a low gluten flour. And, egg white will increase the leavening power of the dough by increasing its elasticity, while egg yolks add richness and color to the product.

The flour is preferably a hard winter wheat flour and is employed with water at a ratio of flour-to-water within the range of from about 3:2 to about 3:1, with a ratio of about 2:1 being preferred. Where eggs are employed, they add significant amounts of moisture, and the amount of free water added can be reduced accordingly. Again, it must be stressed that the skill and experience of the baker is extremely important and the final proportions must be altered as necessary to obtain the desired texture.

The fat is preferably a plastic fat of the kind known to the art and specially formulated for this process. Fats like butter and margarine can be employed, but are preferably first plasticized by mechanically working to the desired consistency, as known to the art. Typically, the fats will have low moisture contents, on the order of about 5% or less, and preferably about 2%. Many fats are specially formulated for this purpose; among these are those disclosed in U.S. Pat. No. 2,442,537 to Eckey. If desired, flavors, particularly fat-soluble flavors, can be added to the fat. The fat is important, not only for its functional effects on layering and subsequent rising ability, but also for its organoleptic contribution. Accordingly, fat contents of from 20 to 60% based on the total weight of the puff pastry dough are typical. Preferably, fat contents of from 35 to 50% on this same basis will be employed. This fat is present in thin layers between dough layers in the sheet 10 and is further stretched and flattended with each rolling.

Once the sheet 10 shown in FIG. 1 is provided by the above or other process, the central portion 12 thereof is perforated or otherwise disrupted as described. The sheet can then be baked, as is, to yield a product having a raised peripheral portion 116 and a less highly raised central portion 112. The central portion of the resulting puff pastry shell can then be filled as desired. Preferably, however, the filling for the recess 112 is supplied by placing a food insert 18 directly over the central portion 12 of unbaked sheet 10 of puff pastry dough, as shown in FIG. 2. Upon baking the sheet 10 having the food insert 18 disposed over the central portion 12 thereof, the food insert will cook and fill a recess 112 formed as said peripheral portion 16 of the sheet rises during baking to form a shell 116 encompassing filling 118.

The food insert 18 can comprise meat, fruit, vegetable, confection, cheese, or any of a wide variety of food materials. The food insert 18 can be stored well when frozen. Upon cooking, a frozen insert will first thaw and then heat, as the puff pastry shell rises about it. Frozen storage is especially useful where the food insert 18 comprises a flowable mass such as a sauce, because the puff pastry will then rise as the insert becomes fluid and will contain fluid within recess 112. It is preferred when sauces are employed to formulate the sauce effectively to prevent flow thereof onto the peripheral portion 16 of the sheet 10 during baking. One method of doing this is to add sufficient thickeners, such as hydrophilic colloids, to increase the viscosity to above about 7000 centipoises at 83° C., as measured by Brookfield viscometer using a number 3 spindle rotated at 10 RPM. These can be any of those known to the art for this purpose and will preferably be a hydrophilic colloid, and can be selected from the group consisting of microcrystalline cellulose, carageenin, guar gum, alginate, xanthan gum, methyl cellulose, carboxymethyl cellulose, ethyl cellulose, hydroxypropylmethyl cellulose, dextrins, starch, gelatin, locust bean gum, pectin, and the like and mixtures of these. Of particular interest are those materials such as hydroxypropylmethyl cellulose, xanthan, gum, guar gum, and starch, which stabilize the viscosity of the sauce or cause it to rise as the temperature is increased.

The food product of the present invention can be packaged and stored refrigerated as a dough sheet 10 alone or in combination with a food insert 18. Frozen storage is preferable, especially where a food insert, and particularly one with a sauce, is included. The product can be cooked directly after removal from storage, preferably at a temperature of from about 188° to 218° C. for from about 20 to about 30 minutes, depending upon the exact formulation and geometry of the product.

The following examples are presented for the purpose of further illustrating and explaining the present invention, and are not to be taken as limiting in any regard. Unless otherwise indicated, all parts and percentages are by weight.

EXAMPLE I

This example describes the preparation of a food product of the type shown in FIG. 1, according to the present invention and the baking thereof to form a product of the type shown in FIG. 3.

A sheet of puff pastry dough is prepared from the following ingredients:

| Ingredient | Parts by Weight |
| --- | --- |
| Bread Flour | 38.54 |
| Puff Pastry Fat | 37.54 |
| Water | 23.00 |
| Salt | .60 |
| Baking Powder | .32 |

The flour, salt, baking powder and a 3/5 part of the fat are first blended for 5 minutes in a Hobart mixer fitted with a paddle. The water is then added and mixed 5 minutes into a uniform dough. This dough is then rolled into a sheet 3 times its width and 1.3 cm thick. Two thirds of the surface of this sheet are then coated with the remaining fat at a temperature of 10° C. The uncoated one third of the sheet is then folded over onto the adjacent fat-coated third and the remaining one third is folded on top thereof. The resulting composite, which now has three layers of dough separated by two layers of fat, is floured and rolled to a thickness of about 1.2 cm, and a length of 3 times of the width. Excess flour is brushed off and the sheet is again folded in thirds. The folded sheet is then covered and allowed to rest for 30 minutes at 7° C. This rolling, folding and resting is repeated 3 times, whereupon the sheet is rolled one final time, rested for 60 minutes and cut into 4×5 cm squares 0.5 cm thick. A central portion of some of the squares is then disrupted by perforating with a fork, making approximately 9 evenly-spaced perforations. One of the squares having the perforated central portions is baked approximately 20 minutes in an oven at 202° C. and results in a product essentially as shown in FIG. 3, wherein the central perforated portion is recessed in relation to the peripheral, unperforated portion. The resulting pastry shell is fully cooked, even in the central portion, and can be filled directly with a food with no need to scoop out the central portion and waste a portion of the pastry.

EXAMPLE II

This example describes the preparation of a food product essentially as shown in FIG. 2 and baking it to result in a product of the type shown in FIG. 4.

A sheet of puff pastry dough prepared in EXAMPLE I with the central portion thereof perforated, has a piece of sausage meat disposed over the central portion. The product is then baked as in EXAMPLE I, to yield a fully-cooked product with the peripheral portion having risen up to surround the sausage, which fills a recess in the center of the resulting pastry shell.

EXAMPLE III

The procedure of EXAMPLE II is repeated, but this time both the sheet of puff pastry dough and a frozen food insert based on the following formulation were stored frozen overnight:

| Ingredient | Parts by Weight |
|---|---|
| Puff Pastry | 60.00 |
| White Sauce* | 25.00 |
| Turkey Meat | 12.00 |

*Sauce comprised: 5% flour, 3% chicken fat, 2% vegetable oil, 1.50% corn starch, 0.87% flavors, 45% heavy cream and 42.73% fresh milk.

Again, the pastry is fully cooked; and this time, the food insert has melted and cooked to provide a turkey & meat sauce which fills the resulting puff pastry shell.

EXAMPLE IV

This example presents a comparison wherein the procedure of EXAMPLE III is followed exactly, except that the central portion of the sheet is not perforated according to the invention. This time, the sauce spilled out over the sheet imparing its rise, producing an unsightly, unevenly-risen product, which was incompletely cooked at the center.

The above description is for the purpose of teaching the person skilled in the art how to practice the present invention. This description is not intended to detail all of the obvious modifications and variations of the invention, which will become apparent upon reading. However, applicants do intend to include all such obvious modifications and variations within the scope of their invention which is defined by the following claims.

What is claimed is:

1. A frozen food product which is adapted for the preparation of a filled pastry shell and comprises: an unbaked sheet of puff pastry dough comprising a central portion which is sufficiently disrupted to reduce normal rising, and a substantially-continuous peripheral portion which rises to a greater extent than the central portion during baking; and a frozen food insert comprising a sauce containing a thickener disposed over said central portion of said sheet of puff pastry dough, whereby the food insert will fill a recess formed as said peripheral portion of the sheet rises during baking to form a shell.

2. A food product according to claim 1, wherein the sheet of puff pastry dough comprises a plurality of thin, substantially-continuous dough layers which are separated from each other by interposed layers of fat.

3. A food product according to claim 2, wherein the sheet of puff pastry dough comprises at least 10 dough layers separated from each other by layers of fat.

4. A food product according to claim 1, wherein the sheet is substantially uniform in thickness throughout.

5. A food product according to claim 1, wherein the sheet of puff pastry dough has an overall thickness within the range of from about 1/16 to about ¼ inch.

6. A food product according to claim 1, wherein the peripheral portion of the sheet of puff pastry dough is from ¼ to 1 inch wide.

7. A food product according to claim 1, wherein the central portion of the sheet is disrupted by perforations extending through at least one-half the thickness of the sheet, the perforations allowing moisture vapor generated during baking to escape from the sheet.

8. A food product according to claim 1, wherein the food insert is formulated to prevent flow thereof onto the peripheral portion of the sheet during baking.

9. A process for preparing a food product adapted for the preparation of a filled pastry shell comprising:
providing a substantially-continuous, unbaked sheet of puff pastry dough,
disrupting the central portion of the sheet while leaving the peripheral portion substantially continuous,
placing a frozen food insert comprising a sauce containing a thickener over the central portion of said sheet of puff pastry dough, whereby said food insert will fill a recess formed as said peripheral portion of the sheet rises during baking to form a shell, and
freezing the resulting composite food product.

10. A process according to claim 9, wherein the sheet of puff pastry dough comprises a plurality of thin, substantially-continuous dough layers which are separated from each other by interposed layers of fat.

11. A process according to claim 10, wherein the sheet of puff pastry dough comprises at least 10 dough layers separated from each other by layers of fat.

12. A process according to claim 9, wherein the sheet is substantially uniform in thickness throughout.

13. A process according to claim 9, wherein the sheet of puff pastry dough has an overall thickness within the range of from about 1/16 to about ¼ inch.

14. A process according to claim 9, wherein the peripheral portion of the sheet of puff pastry dough is from ¼ to 1 inch wide.

15. A process according to claim 9, wherein the central portion of the sheet is disrupted by perforating the sheet to a depth of at least one-half the thickness of the sheet, the resulting perforations being adapted to permit moisture vapor generated during baking to escape from the sheet.

16. A process according to claim 9 wherein the food insert is formulated to prevent flow thereof onto the peripheral portion of the sheet during baking.

* * * * *

UNITED STATES PATENT OFFICE
CERTIFICATE OF CORRECTION

PATENT NO. : 4,275,082
DATED : June 23, 1981
INVENTOR(S) : Ernest V. Dougan

It is certified that error appears in the above-identified patent and that said Letters Patent are hereby corrected as shown below:

Column 1, line 39, "napoleans" should read -- napoleons --.

Column 6, line 31, the comma between "xanthan" and "gum" should be deleted.

Column 7, line 55, delete the ampersand;

line 63, "imparing" should read -- impairing --.

Column 8, line 3, "do" should read -- does --;

line 4, "their" should read -- his --.

Signed and Sealed this

Fifteenth Day of September 1981

[SEAL]

Attest:

GERALD J. MOSSINGHOFF

Attesting Officer     Commissioner of Patents and Trademarks